United States Patent [19]
De Armas

[11] Patent Number: 5,856,719
[45] Date of Patent: Jan. 5, 1999

[54] ELECTROMAGNETIC-COUPLED/ LEVITATED APPARATUS AND METHOD FOR ROTATING EQUIPMENT

[76] Inventor: Jorge De Armas, 3619 A Leafield Dr., Austin, Tex. 78749

[21] Appl. No.: 832,413

[22] Filed: Apr. 2, 1997

Related U.S. Application Data

[63] Continuation of Ser. No. 353,611, Dec. 12, 1994, abandoned.

[51] Int. Cl.⁶ .................................................. H02K 49/00
[52] U.S. Cl. ...................... 310/103; 310/90.5; 310/75 R; 310/104; 310/68 R; 310/114; 310/115; 417/420; 417/424.1
[58] Field of Search ............................... 310/75 D, 75 R, 310/103, 104, 90.5, 92, 78, 265, 115, 114; 417/410.1, 420, 423.1, 423.6, 423.12, 424.1

[56] References Cited

U.S. PATENT DOCUMENTS

| | | | |
|---|---|---|---|
| 2,754,465 | 7/1956 | Brier | 318/488 |
| 3,107,310 | 10/1963 | Carriere et al. | 310/103 |
| 3,221,389 | 12/1965 | Cowell | 29/116 |
| 3,591,818 | 7/1971 | Fulton | 310/104 |
| 3,936,683 | 2/1976 | Walker | 310/103 |
| 4,115,040 | 9/1978 | Knorr | 417/420 |
| 4,146,805 | 3/1979 | Fehr et al. | 310/104 |
| 4,163,164 | 7/1979 | Pieters | 310/103 |
| 4,373,147 | 2/1983 | Carlson, Jr. | 318/48 |
| 4,375,047 | 2/1983 | Nelson et al. | 318/48 |
| 4,743,817 | 5/1988 | Shimizu | 318/488 |
| 4,841,204 | 6/1989 | Studer | 318/254 |
| 5,032,751 | 7/1991 | Morita | 310/90.5 |
| 5,056,049 | 10/1991 | O'Neill | 364/562 |
| 5,078,741 | 1/1992 | Bramm et al. | 623/3 |
| 5,209,650 | 5/1993 | Lemieux | 417/356 |
| 5,248,245 | 9/1993 | Behnke et al. | 417/366 |
| 5,270,600 | 12/1993 | Hashimoto | 310/75 D |
| 5,355,042 | 10/1994 | Lewis et al. | 310/90.5 |
| 5,376,862 | 12/1994 | Stevens | 310/75 D |
| 5,504,381 | 4/1996 | Kato | 310/51 |

*Primary Examiner*—Thomas M. Dougherty
*Assistant Examiner*—B. Mullins
*Attorney, Agent, or Firm*—Alton W. Payne

[57] ABSTRACT

A drive for rotating equipment that does not require internal or external mechanical seals and obviates the necessity to have internal shaft and bearings, eliminating internal lubrication problems and can be used with different types of prime movers is provided. A driven rotor, connected to the prime mover, with mounted horizontal stop rings, vertical stop rings, permanent magnet for floating rotor position, and permanent rotor drive magnet is driven by a driver rotor mounted with strain gauge and permanent magnet, electromagnet for driven rotor position and drive, strain gauges signal transmission rings, and electromagnet current transmission rings. The driver rotor, by using the signal generated by the strain gauges, varies current to the electromagnets controlling magnetic field forces to float the driven rotor. When the unit is shutdown the driven rotor rests on the vertical stop rings uncoupled. The diamagnetic rotor casing is in between the driven rotor and driver rotor and is part of the envelope separating the fluid handled from the environment. The electromagnetic-coupled/levitated drive of this invention can be used to actuate a great variety of rotating equipment in addition to the ones cited, such as multistage centrifugal compressors and multistage centrifugal pumps. The present invention will also serve as the basis for the design of new types of equipment such as the tube pump described herein. In addition, the present invention will make possible the use of sealless units for handling a tremendous variety of fluids that are harmful to people and the environment, eliminating the possibility of leakage, without the problem of maintenance of internal bearings or seals while substantially reducing equipment vibration. A method is also provided.

19 Claims, 10 Drawing Sheets

ELECTROMAGNETIC-COUPLED/ LEVITATED APPARATUS AND METHOD FOR ROTATING EQUIPMENT

CROSS REFERENCE TO RELATED APPLICATION

The present application is a continuation application of prior application Ser. No. 08/353,611 filed on Dec. 12, 1994, now abandoned, of Jorge de Armas for "Electromagnetic-Coupled/Levitated Apparatus And Method For Rotating Equipment."

FIELD OF THE INVENTION

The present invention relates generally to drives for rotating equipment. Specifically, the present invention relates to a driver for rotating equipment that is electromagnetically coupled and levitated.

BACKGROUND OF THE INVENTION

To solve the leakage problem encountered on centrifugal equipment, such as pumps compressors and fans, at the point where the rotating shaft penetrates the stationary casing, components such as packing and mechanical seals are used. However these components fail from time to time resulting in releases of handled fluid to the environment and sometimes damage to the equipment. To avoid this problem permanent magnetic drives that work inside the handled fluid envelope were developed. Also can pumps where the induction motor rotor is inside the handled fluid envelope was developed. These two solutions have the problem that the internal shaft and bearings are in contact with the pumped fluid which also has to serve as the lubricating medium. This creates internal shaft/bearing maintenance problems. Additional drawbacks of the can pump approach are: the effect that motor rotor induced currents can have on the pumped fluid, an the prime mover must be an induction motor.

The development of magnetic bearings used in combination with can pumps has obviated the leakage and internal bearing maintenance problems in centrifugal pumps, however the drawbacks of the effects of motor rotor induced currents and limitation to the use of an induction motor as a prime mover remains.

The magnetic bearings mentioned above, consist of stationary electromagnets that induce magnets on the equipment rotor shaft, and by controlling current to the electromagnet, produce equipment rotor levitation. They are also used with prime movers external to the equipment casing such as large centrifugal pumps, centrifugal compressors and centrifugal fans, mechanical seals are required for these cases.

To eliminate such problems, can pumps were developed. Can pumps have the induction motor rotor inside the handled fluid envelope. Such solutions have the problem that the internal shaft and bearings are in contact with the pumped fluid. Also, the pumped fluid serves as the lubricating medium. This creates internal shaft/bearing maintenance problems. Additional drawbacks of the can pump approach include, without limitation, the effect that motor rotor induced currents can have on the pumped fluid and the prime mover must be an induction motor.

Generally, the development of magnetic bearings used in combination with can pumps has obviated the leakage and internal bearing maintenance problems in centrifugal pumps. However, the drawbacks of the effects of motor-rotor induced currents and the limitation associated with the use of an induction motor as a prime mover remains.

The magnetic bearings, known in the art and discussed above, consist of stationary electromagnets that induce magnets on the equipment rotor shaft. By controlling the current to the electromagnet, levitation of the equipment rotor is possible. Such devices are also used with prime movers external to the equipment casing, such as, for example, large centrifugal pumps, centrifugal compressors and centrifugal fans. In these devices, mechanical seals are required.

Sensing devices are also known. For, example strain gauges are known. Strain gauges have been used to measure stress, pressure and torque. Further, rotating transmission rings and fixed pick-up devices have been used for years for the conveyance of control and power electric currents between fixed and rotating parts in electric generators and motors.

It is, therefore, a feature of the present invention to provide an electromagnetic coupled/levitated drive for rotating equipment.

Another feature of the present invention is to provide, as part of a driven rotor, an active component of the driven equipment such as a pump or compressor impeller.

Another feature of the present invention is to provide an electromagnetic coupled/levitated drive suitable for use with different types of prime movers such as electric motors, combustion engines and gas or steam turbines.

Yet another feature of the invention is to provide, for centrifugal pumps, centrifugal compressors and centrifugal fans, a true sealed unit that makes it impossible the escape of polluting fluids to the environment.

Another feature of the present invention is to provide, for centrifugal pumps, centrifugal compressors and centrifugal fans, the possibility to use different types of prime movers and without inducing currents in the pumped fluid, Another feature of the present invention is to provide, for centrifugal pumps, centrifugal compressors and centrifugal fans, a levitating rotor which eliminates the possibility of internal bearing failure, diminishes equipment down time and reduces maintenance.

Yet another feature of the invention is to provide, for centrifugal pumps, centrifugal compressors and centrifugal fans, a reduction of equipment vibration.

Still another feature of the present invention is to provide, for a tube pump that practices the present invention.

Yet still another feature of the present invention is to provide, for the tube pump, reduced NPSH requirement.

Another feature of the present invention is to provide, for the tube pump, the ability to handle large pieces of solids with the liquid fluid.

Another feature of the present invention is to provide, for the tube pump, ease of installation on an existing line.

Another feature of the present invention is to provide, for the tube pump, no change in flow direction for single stage applications.

Additional features and advantages of the invention will be set forth in part in the description which follows, and in part will become apparent from the description, or may be learned by practice of the invention. The features and advantages of the invention may be realized by means of the combinations and steps particularly pointed out in the appended claims.

SUMMARY OF THE INVENTION

To achieve the foregoing objects, features, and advantages and in accordance with the purpose of the invention as embodied and broadly described herein is an electromagnetic-coupled/levitated apparatus and method for rotating equipment.

The electromagnetic-coupled/levitated apparatus for rotating equipment comprises a driver assembly in communication with a prime mover. The prime mover provides power to the driver assembly. The driver assembly includes at least one magnet for creating a magnetic field, and a distance sensor for communicating with an optional exciter. The distance sensor controls the strength of the magnetic field associated with the magnet of the driver assembly. An activated assembly is in magnetic communication with the driver assembly such that the driver assembly provides power to the activated assembly, and the driver assembly and the activated assembly are in electromagnetic coupled relationship with respect to movement. The activated assembly comprises at least one magnet for creating a magnetic field, and at least one exciter for communicating with the distance sensor of the driver assembly for identifying the positional relationship of the driver assembly with respect to the actuated assembly. The exciter and the sensor generate a signal for controlling the magnetic fields associated with the magnets in the assemblies for providing a levitating coupled relationship between the driver assembly and the activated assembly. Further, a containment assembly is provided for separating the driver assembly and the activated assembly such that any material associated with the activated assembly is isolated therein and any material associated with the driver assembly is isolated therein.

Preferably, the distance sensor is a strain gauge having a permanent magnet associated therewith, and the exciter is a permanent magnet for interacting with the strain gauge magnet in a like pole configuration. In a preferred embodiment, the magnets associated with the driver assembly are electromagnets and the magnets associated with the activated assembly are induced in ferro-magnetic elements.

In another embodiment of the present invention, a method of electromagneticly coupling levitating rotating equipment is provided. The method for levitating and coupling rotating equipment comprises the steps of engaging a prime mover with a driver assembly, generating a magnetic field from the driver assembly, spacially engaging within the magnetic field an activated assembly responsive to the magnetic field such that the activated assembly is in one-to-one positional relationship with the driver assembly, separating the driver assembly and the activated assembly such that any material associated with the activated assembly is isolated therein and any material associated with the driver assembly is isolated therein, and maintaing the driver assembly and the activated assembly in levitatingly coupled relationship such that the power from the prime mover is transfered to the activated assembly for powering the rotating equipment.

BRIEF DESCRIPTION OF THE DRAWINGS

The accompanying drawings which are incorporated in and constitute a part of the specification, illustrate a preferred embodiment of the invention and together with the general description of the invention given above and the detailed description of the preferred embodiment given below, serve to explain the principles of the invention.

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENTS

Reference will now be made in detail to the present preferred embodiments of the invention as described in the accompanying drawings.

Generic Embodiments

Figure 1:
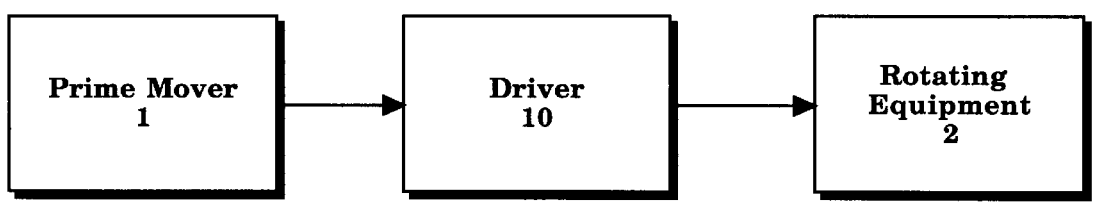
FIG. 1 is a schematic illustration of the present invention.

FIG. 1 is a general schematic view illustrating the relationship between the prime mover and the rotating equipment as practiced with the electromagnetic-coupled/levitated drive of the present invention. The drive provides a sealed, environmentally safe means for applying a prime mover to any rotating equipment.

Figure 2:
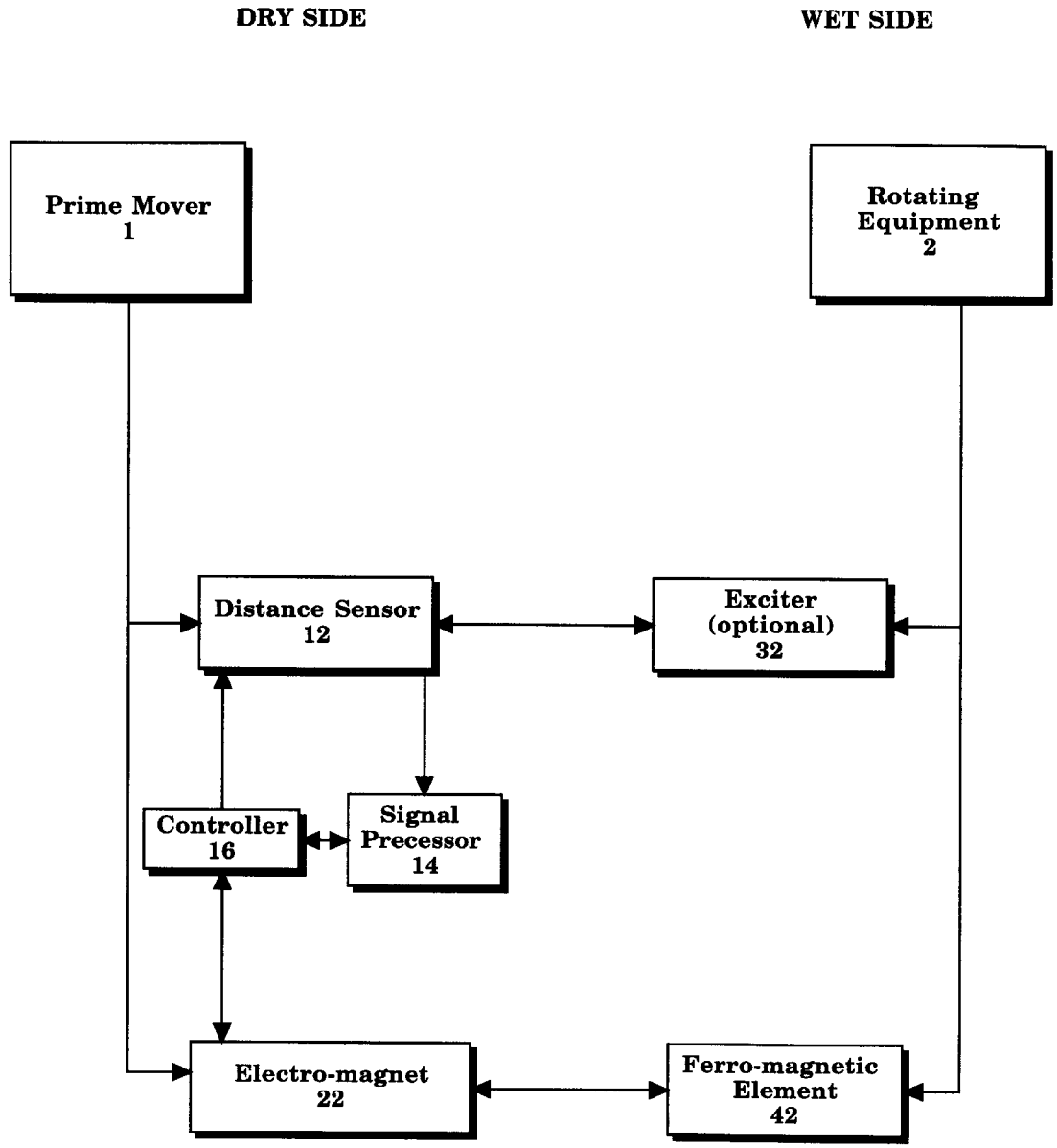
FIG. 2 is a more detailed schematic illustration of FIG. 1 showing the relationship of the parts with respect to contact with the rotating equipment.

FIG. 2 is a more detailed schematic illustration of FIG. 1 showing the relationship of the parts with respect to contact with the rotating equipment. FIG. 2 illustrates an embodiment of the present invention as distinguished between the containment of the material associated with the rotating equipment and the isolation of the prime mover. FIG. 2 illustrates that a prime mover 1 can move the rotating equipment 2 via the driver 10. The driver 10 has a "wet" side and a "dry" side. The wet side is the side associated with the rotating equipment 2. The wet side is comprised of an exciter 32 and a ferro-magnetic element 42 which operate to drive the rotating equipment 2. The prime mover is associated with a distance sensor 12 and an electro-magnet 22. The distance sensor 12 is in operative communication with the exciter 32 such that a signal can be generated by the distance sensor 12 to keep the drive of the present invention in levitation during operation. The distance sensor 12 is associated with a signal processor 14. The signal processor 14 communicates with a controller 16 which modulates current to the electromagnet 22 and maintains levitation for the efficient use of the drive of the present invention. Similarly, the electromagnet 22 is in operative association with the ferro-magnetic element 42. The combination of the electromagnet 22 and the ferro-magnetic element 42 provides both levitation and torque. The relationship of the electromagnet 22 and the ferro-magnetic element 42 can be altered, to maintain the effective operation of the drive of the present invention by the controller 16. Although the signal processor 14 and the controller 16 are illustrated as communicating with both the distance sensor 12 and the electro-magnet 22, it can be appreciated by those skilled in the art that separate processors and controllers, in unison, combination or any other embodiment, are readily adaptable for use in the present invention.

Figure 3:
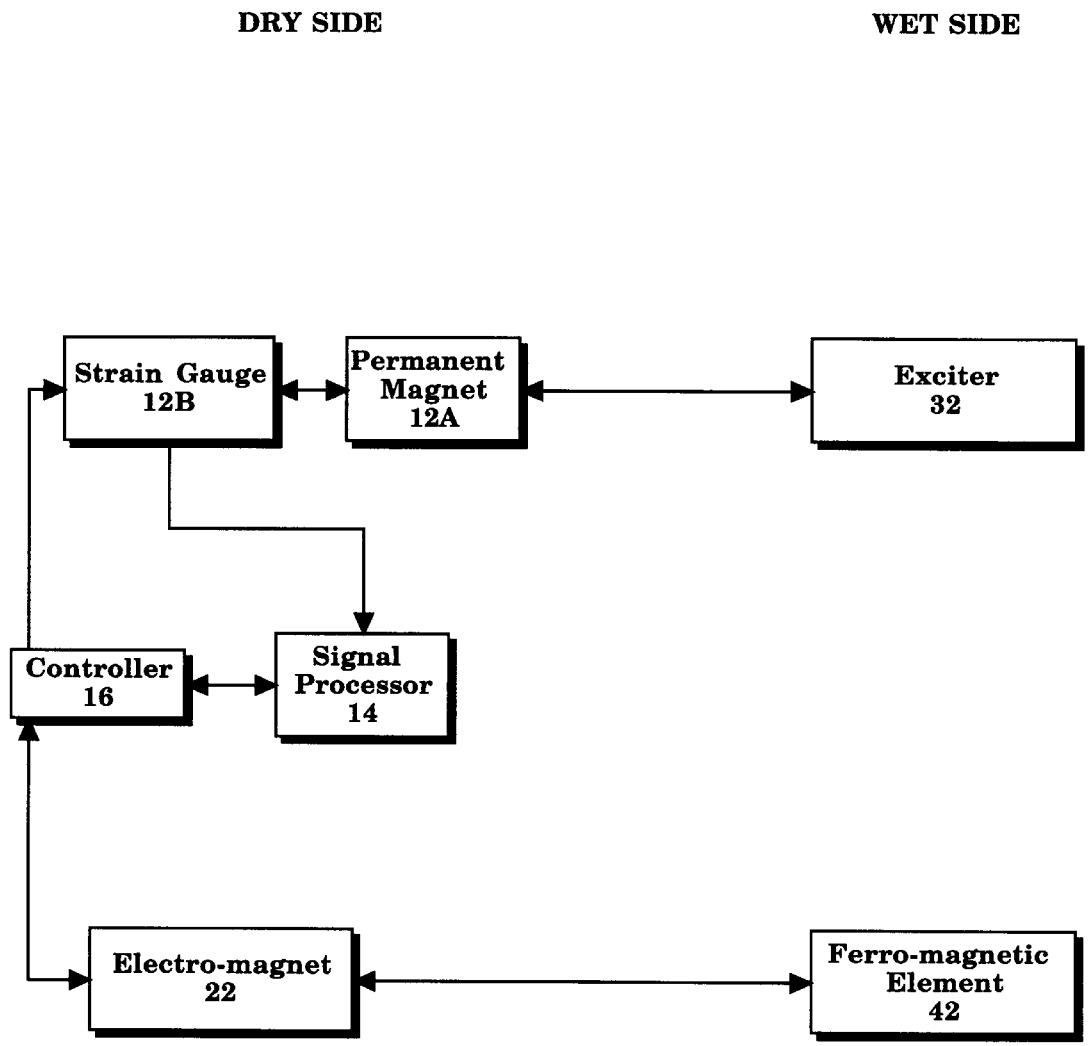
FIG. 3 is a more detailed illustration of the present invention showing a preferred embodiment of the present invention.

FIG. 3 is another schematic embodiment of the present invention illustrating a preferred embodiment of the distance sensor 12. As illustrated in FIG. 2, the distance sensor 12 is preferably made of a permanent magnet 12A and a strain gauge 12B. The strain gauge 12B is operatively associated with the permanent magnet 12A such that the relationship there between provides a uniquely sensitive protector with respect to a magnetic field generated between the respective permanent magnets 32, 12A.

Operation

The operation of all devices described herein is basically the same. From a shut down non-energized position, a driven rotor rests on vertical movement stops. The prime mover will not start until the driven rotor is coupled and the driver rotor is in a levitating condition. A start switch will allow current to flow via transmission rings or the like, to strain gauges, electromagnets for an optional thrust bearing and electromagnets mounted on the driver rotor. When power is established, the driven rotor will go from resting on the stops to a nonrotating coupled levitation condition. This is accomplished by controlling the current to the electromagnets and changing, as required, the strength of the magnetic fields associated with the ferromagnet/electromagnet couples. A control signal is generated by the permanent magnet for levitating the rotor control/strain gauge combination.

The strain gauge generates a control signal that is used to modulate current to the electromagnets for levitation control. A permissive switch activates the prime mover. The electromagnet/ferromagnet couples are designed to provide the required torque to drive the apparatus for appropriate load/floatation combinations. The working of the components as described herein will maintain the driven rotor in a floating condition from nonrotation to full rpm load condition.

During shut down, the drive can be maintained in an energized floating nonrotating condition or nonenergized condition with the driven rotor resting on the stop rings.

Specific Examples of Embodiments

Figure 4:
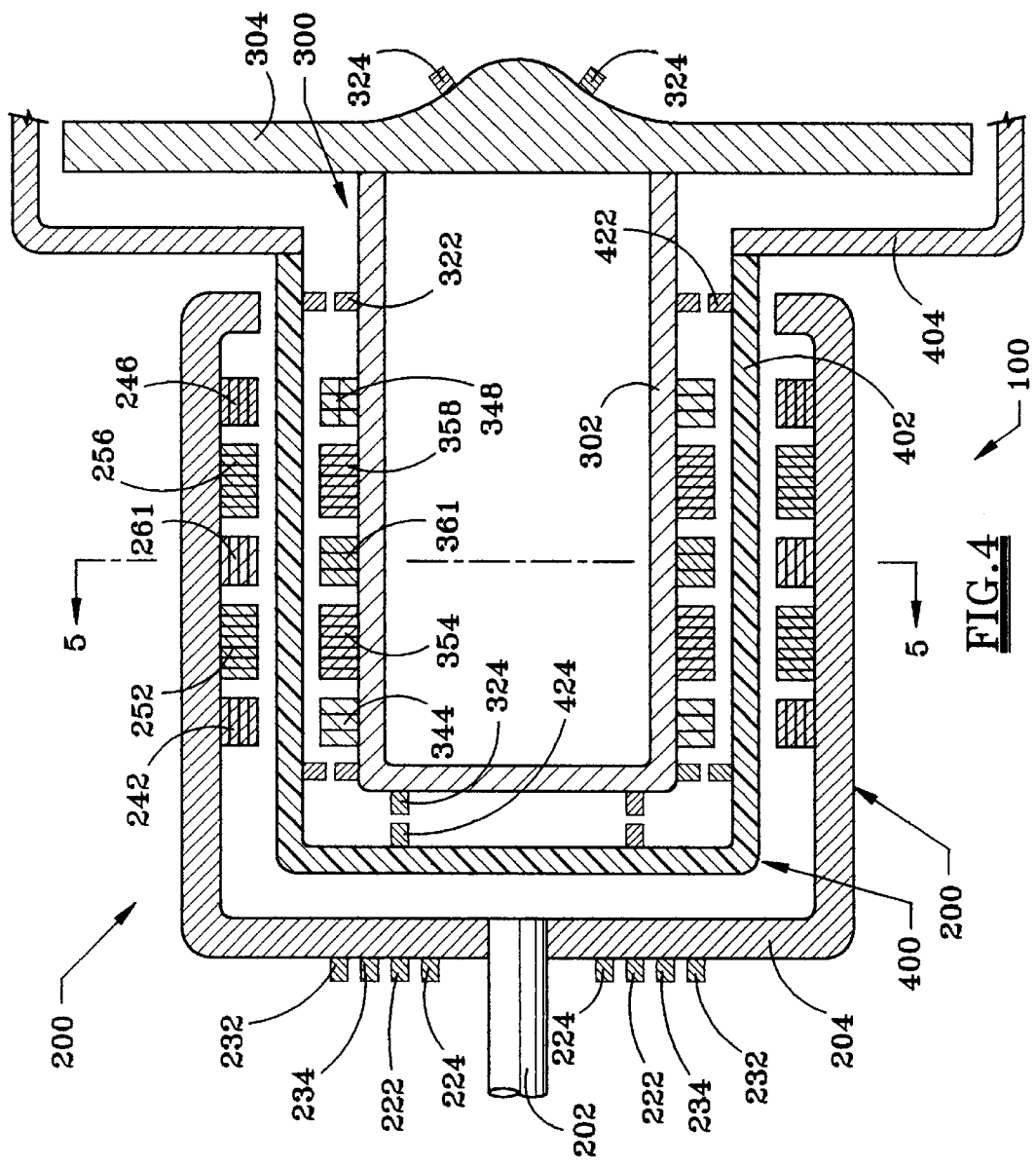
FIG. 4 is an elevation view of a preferred embodiment of the electromagnetic-coupled/levitated drive invention of the present application.

FIG. 4 is a cross-sectional elevation view of an electromagnetic coupled/levitated drive 100 which can be used with a variety of rotating equipment, such as, for example, multi-stage centrifugal compressors and multi-stage centrifugal pumps. The illustration of FIG. 4 provides an example of the present invention which results in a sealless unit providing an environmentally and structurally safe energizing apparatus. Generally, the electromagnetic coupled/levitated drive 100 comprises a driver assembly 200, a activated assembly 300 and a containment assembly 400. Leakage is prohibited based upon the containment assembly 400. The containment assembly 400 separates the driver assembly 200 from the activated assembly 300.

A preferred embodiment of the present invention, as illustrated in FIG. 4, provides an activated assembly that has buoyancy for enhancing the efficacy of the invention. The rotor 302 may, for example, be hollow so as to create buoyancy for the activated assembly 300 with respect to the driver assembly 200. Buoyancy provides an upward force as a result of the pumped fluid being more dense than the hollow rotor 302. The buoyancy enhances movement characteristics, reduces the required magnetic field strength during levitation and reduces friction when not levitating. It can be appreciated by those skilled in the art that buoyancy can be utilized in various and sundry ways for accomplishing the levitation and drive functions of the present invention.

Also preferred, as illustrated in FIG. 4, the present invention provides that the interacting movement-related components are arranged to provide a symmetrical configuration about the center of gravity of the components. For example, the electro-magnet/ferro-magnetic element pairs 252/354, 256/358 are positioned to straddle the center of gravity of the activated assembly 300.

The driver assembly 200 comprises a driver rotor 204 and a shaft 202 which is connected to a prime mover. As the prime mover turns the shaft 202, the shaft rotates the driver rotor 204. The device as illustrated in FIG. 4 provides a driver rotor 204 having a generally cylindrical configuration. The shaft 202 is aligned to be placed along the longitudinal central axis of the cylindrical driver rotor 204. The sides of the cylindrical driver rotor 204 are moved in a circular path around the shaft 202.

Also, the driver assembly 202 has, engaged with the inner wall of the sides of the cylindrically oriented driver rotor 204, a number of other components. The additional components are a distance sensor 242, an electro-magnet 252, a electro-magnet 261, and a second electro-magnet 256 and a second distance sensor 246. The electro-magnet 261 is part of an optional thrust bearing for preventing any axial misalignment between the driver assembly 200 and the activated assembly 300. A containment assembly 400 is provided so as to be inserted into an open end of the driver assembly 200. The containment assembly 400 comprises, at one end, a generally cylindrical configuration which coincides with, but is smaller than, the cylindrical configuration provided by the driver assembly 200. The containment assembly 400 is fixedly secured from movement. Also, the containment assembly 400 comprises a rotor casing 402 and a pump casing 404. The diamagnetic rotor casing 402 is made of material that is not effected by the magnetic fields associated with the present invention, and is termed for use herein as non-magnetic. The casings 402, 404 are in a fixed relationship to the central axis, i.e., the shaft 202 of the driver assembly 200. The containment assembly 400 also has a plurality of vertical stops 422 and horizontal stops 424. The containment assembly 400 has an exterior surface and an interior surface. The exterior surface of the containment assembly 400 associated with the diamagnetic rotor casing 402 provides a facing relationship with the interior of the driver assembly 200. The driver assembly 200 is provided such that it can rotate about the diamagnetic rotor casing 402 of the containment assembly 400.

An activated assembly 300 is in facing relationship to the interior surface of the containment assembly 400. The activated assembly 300 comprises a rotor 302 and an impeller 304. The rotor 302 has an interior surface and an exterior surface. The exterior surface of the propelled rotor 302 is in a facing relationshipwwith the interior surface of the diamagnetic rotor casing 402. Further, the exterior surface of the propelled rotor 302 of the activated assembly 300 has fixedly secured thereto a first exciter 344, a first ferromagnetic element 354, a ferro-magnetic element 361, a second ferro-magnetic element 358 and a second exciter 348. The ferro-magnetic element 361, and the previously discussed electromagnet bar 261, comprise the thrust bearing. Also, the exterior surface of the propelled rotor 302 has a plurality of vertical stops 322 and horizontal stops 324. The vertical and horizontal stops 322, 324 are in an engaging relationship with the vertical and horizontal stops 422, 424 associated with the inner portion of the diamagnetic rotor casing 402 of the containment assembly 400 when in a non-rotating, non-levitating mode.

The impeller 304 of the activated assembly 300 is fixedly secured to the propelled rotor 302. Also, the impeller 304 has one or more horizontal stops 324 which interact with one or more horizontal stops 424 associated with the pump casing 404 of the containment assembly 400 when in a non-rotating, non-levitating mode.

As the driver assembly 200 rotates around the containment assembly 400, the activated assembly 300 is energized and levitated based upon the spacial relationship of the electro-magnets 252, 256 and the ferro-magnetic elements 354, 358. Thus, as the driver assembly 200 is activated with respect to the electro-magnets 252, 256, the activated assembly 300 provides a 1-to-1 moving relationship with the driver assembly 200.

To maintain an acutely aligned relationship for the activated assembly 300, the first and second distance sensors 242, 246 act in cooperation with the exciters 344, 348 fixedly secured to the outer surface of the rotor 302. The distance sensors provide information via the sensor transceivers 232, 234 to a controller (See, FIG. 2). Also, the transceivers 222, 224 provide the current to the electromagnets 252, 256 and 261. The controller provides feed-back to the apparatus of the present invention. The magnetic intensity generated by the electro-magnets 252, 256 provides that the activated assembly 300 is maintained in a location sufficient for the present invention to provide coupling and levitation with respect to the driver assembly 200.

Figure 5:
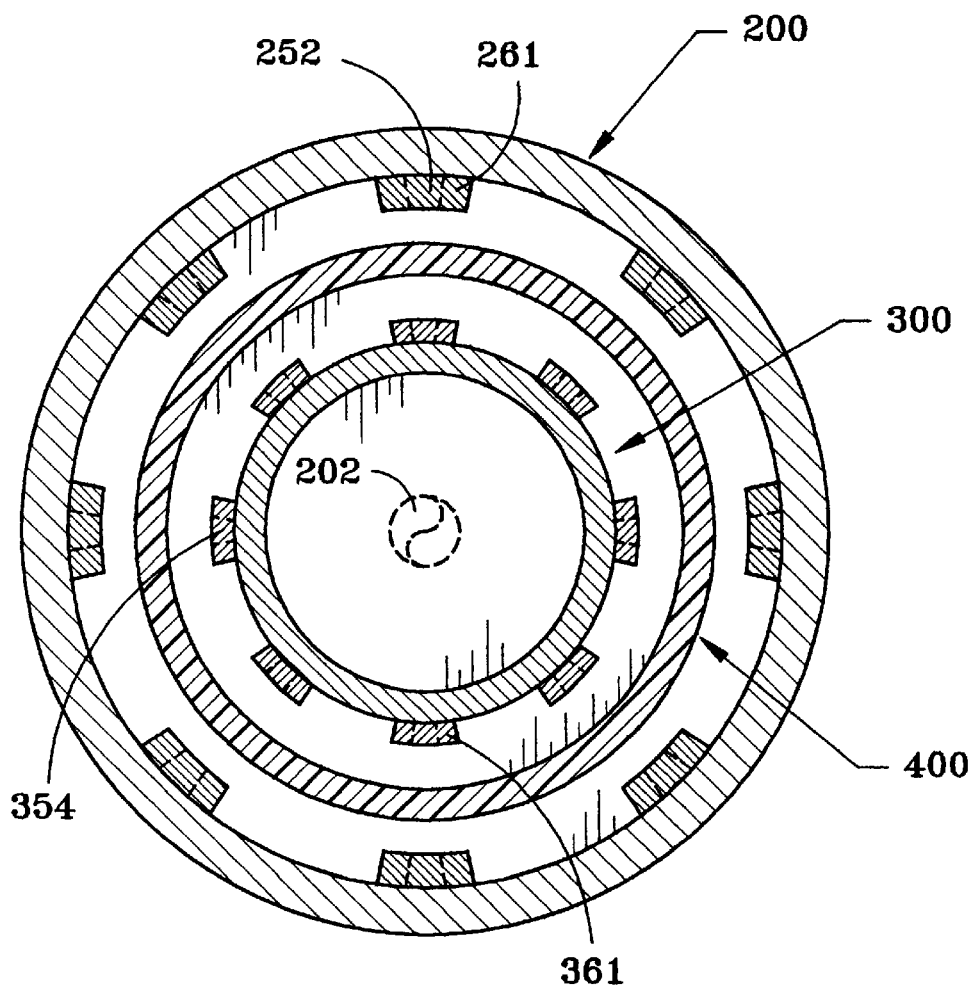
FIG. 5 is a cross-sectional view taken along section lines 5—5 in FIG. 4.

FIG. 5 is a cross section view taken along the section-line 5—5 in FIG. 4. FIG. 5 illustrates the enclosed relationship of the activated assembly 300 with respect to the containment assembly 400. Also, FIG. 5 illustrates the rotating relationship of the driver assembly 200 and the activated assembly 300. Further, FIG. 5 illustrates the aligned relationship of the electro-magnets 252 with the ferro-magnetic elements 354. As the driver assembly 200 rotates about the containment assembly 400, the activated assembly 300 follows, in unison, the driver assembly 200. Also noted for reference on FIG. 5 are the shaft 202 and the electromagnets 261, 361.

Figure 6:
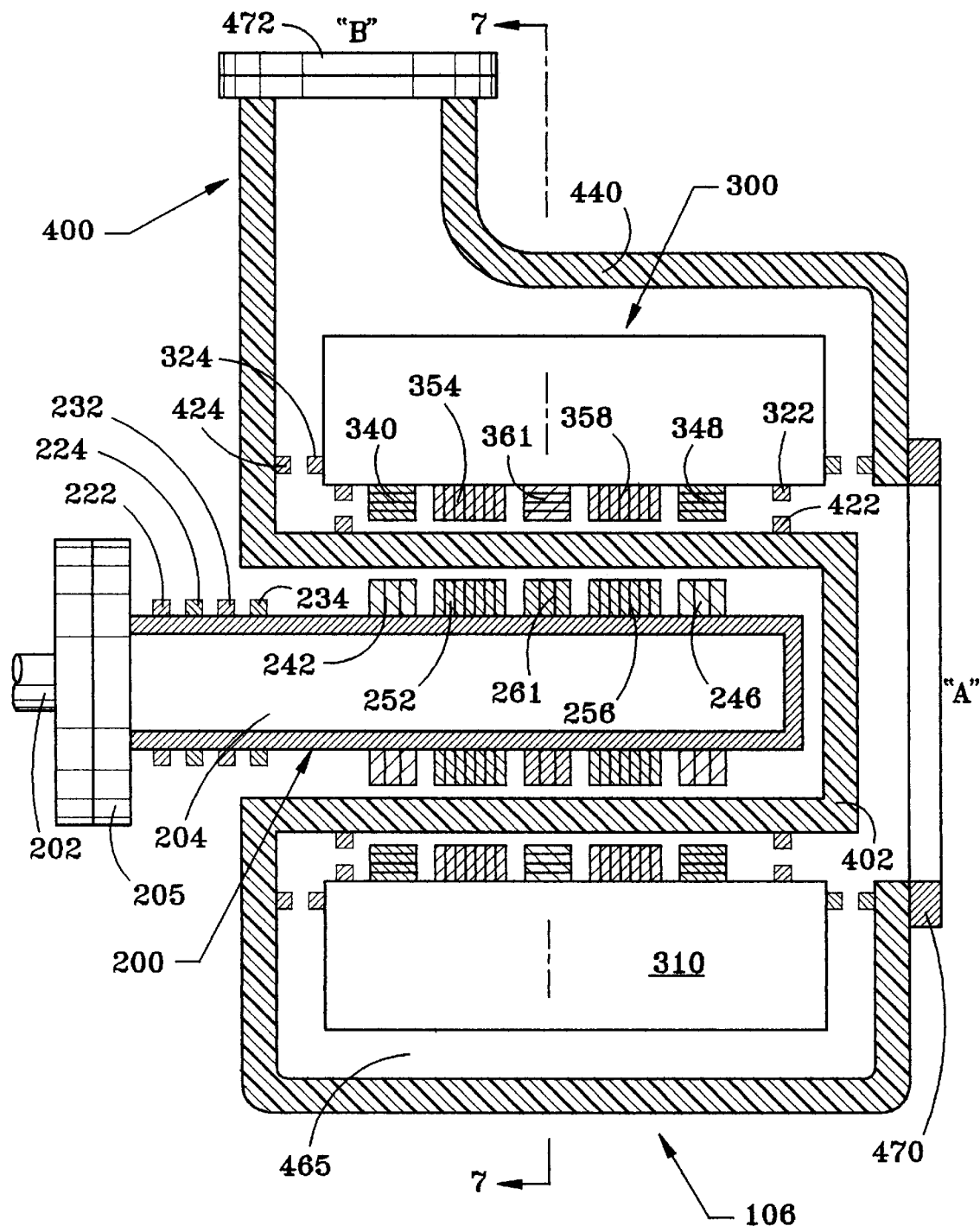
FIG. 6 is a cross-sectional view of another embodiment of the present invention as applied to a fan apparatus.

FIG. 6 is a cross-sectional elevation view of an apparatus practicing the present invention for driving a fan rotor. The apparatus illustrated in FIG. 6 provides a diametrically opposite configuration as illustrated in FIG. 4. Particularly, the driver assembly 200 is interior of the containment assembly 400 and the activated assembly 300, where as in FIG. 4, the driver assembly 200 is exterior of both the containment assembly 400 and the activated assembly 300.

Figure 7:
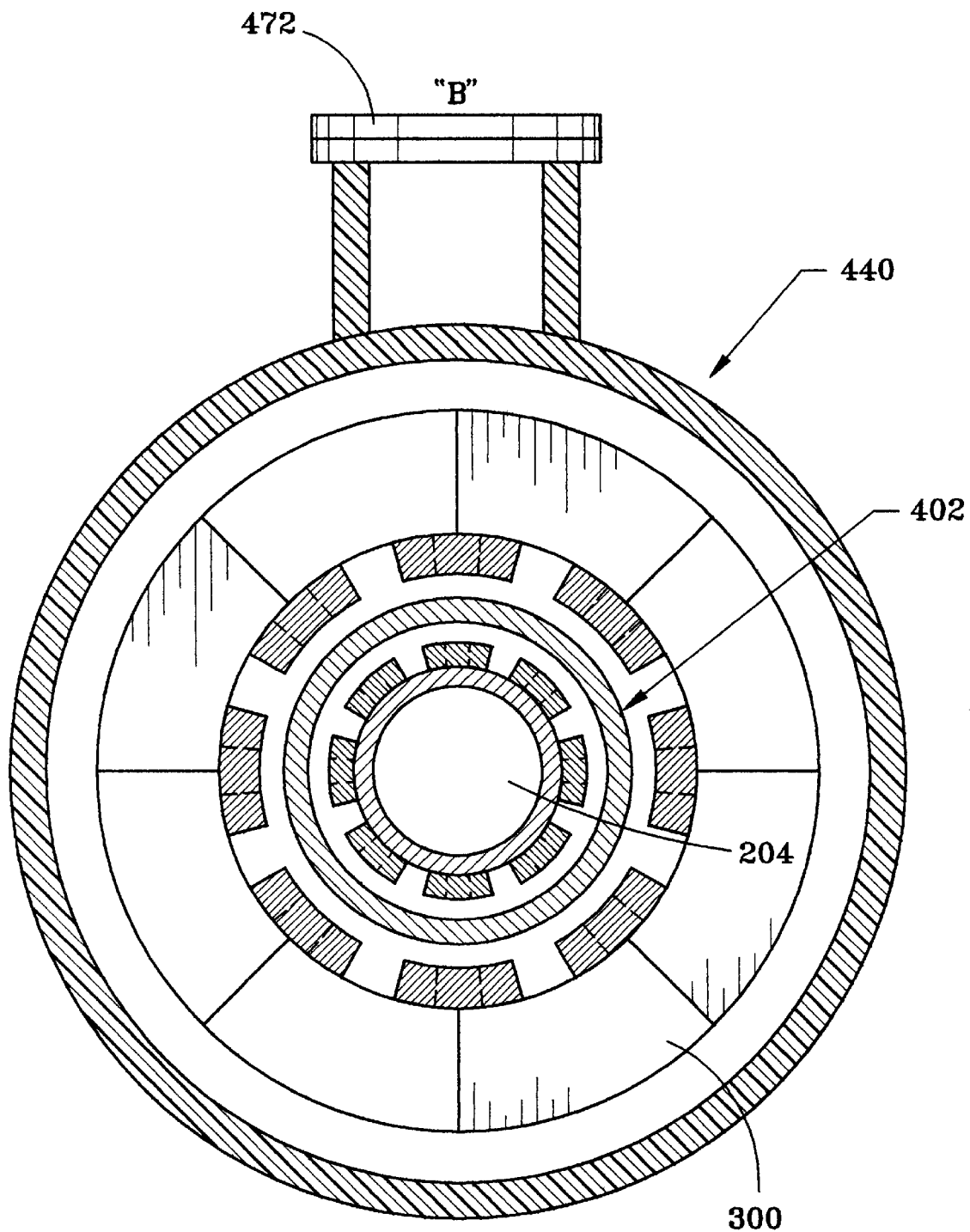
FIG. 7 is a cross section of FIG. 6 taken along the section line 7—7 illustrating the dual containment assembly as practiced with the present invention.

The fan rotor apparatus 106 of the present invention as illustrated in FIGS. 6 and 7 comprises a driver assembly 200, a activated assembly 300 and a containment assembly 400. The driver assembly 200 comprises a shaft 202, a coupling 205 and a driver rotor 204. The driver shaft 202 is rotated by a prime mover (not illustrated). The coupling 205 provides for easy disassembly of the driver rotor 204 from the shaft 202. The driver rotor 204 comprises an elongate member having a generally cylindrical relationship. The driver rotor 204 has an exterior surface upon which a plurality of distance sensors 242, 246, electro-magnets 252, 256 and an electro-magnet 261 for a thrust bearing is provided. Generally, a first sensor 242 and a second sensor 246 are provided for alignment purposes. Similarly, a first electro-magnet 252 and a second electro-magnet 256 are provided in spaced relationship with the sensors 242, 246. Associated with the sensors 242, 246 and the electro-magnets 252, 256 are sensor transceivers 232, 234 and electro-magnetic transceivers 222, 224 which provide control communication with the respective distance sensors and electro-magnets.

The driver assembly 200 illustrated in FIG. 6 is accepted in a cylindrically concaved portion of the containment assembly 400. The concaved portion of the containment assembly 400 provides a diamagnetic rotor casing 402 which has an interior surface which is in facing relationship with the driver rotor 204 of the driver assembly 200.

The containment assembly 400 has, in a radial direction from the diamagnetic rotor casing 402, another chamber for accepting a fan rotor 310. The diamagnetic rotor casing 402 has an outer surface which serves as an inner surface of a fan casing 440.

As illustrated in FIG. 6, the containment assembly 400 provides two chambers: a driver assembly chamber and a fan rotor chamber. The fan rotor chamber is in an annular relationship to the driver chamber. The fan rotor chamber has therein a fan rotor assembly 310. The fan rotor assembly has associated therewith a plurality of exciters and ferromagnetic elements. Particularly, a first exciter 340 is associated with the first distance sensor 242, a first ferromagnetic element 354 is associated with the elceto-magnet 252, a second ferro-magnetic element 358 is associated with a second elceto-magnet 256 and a second exciter 348 is associated with the second distance sensor 246. Optionally, the apparatus illustrated in FIGS. 6 and 7 can include a thrust bearing. The containment assembly 400 and the activated assembly 300 are kept in non-moving spaced relationship using the stops 322, 422, 324, 424 when the equipment is de-energized.

FIG. 7 illustrates the multi-chambered containment assembly 400. The activated assembly 300 is illustrated as a plurality of fan rotor within the exterior annular chamber within the fan casing 440. The driver rotor 204 of the driver assembly 200 is centrally located within the interior annular casing 402 about the cross section illustrated in FIG. 7.

The flow path of pumped material is illustrated in FIG. 6. The flow of a material can enter an aperture A. The aperture A is defined by a suction flange 470. The aperture A is place at a position of low pressure due to the fan rotor 310 being propelled in an annually, cylindrical path about the diamagnetic rotor casing 402 interior of the fan casing 440 of the containment assembly 400. As the fluid enters the suction flange 470 via the aperture A, it is forced to exit via an outlet B through a discharge flange 472. Thus, the flow of fluid enters the aperture A via the suction flange 470 passes through the fan rotor chamber within the containment assembly 400, and exits via another aperture B defined by the discharge flange 472.

Figure 8:
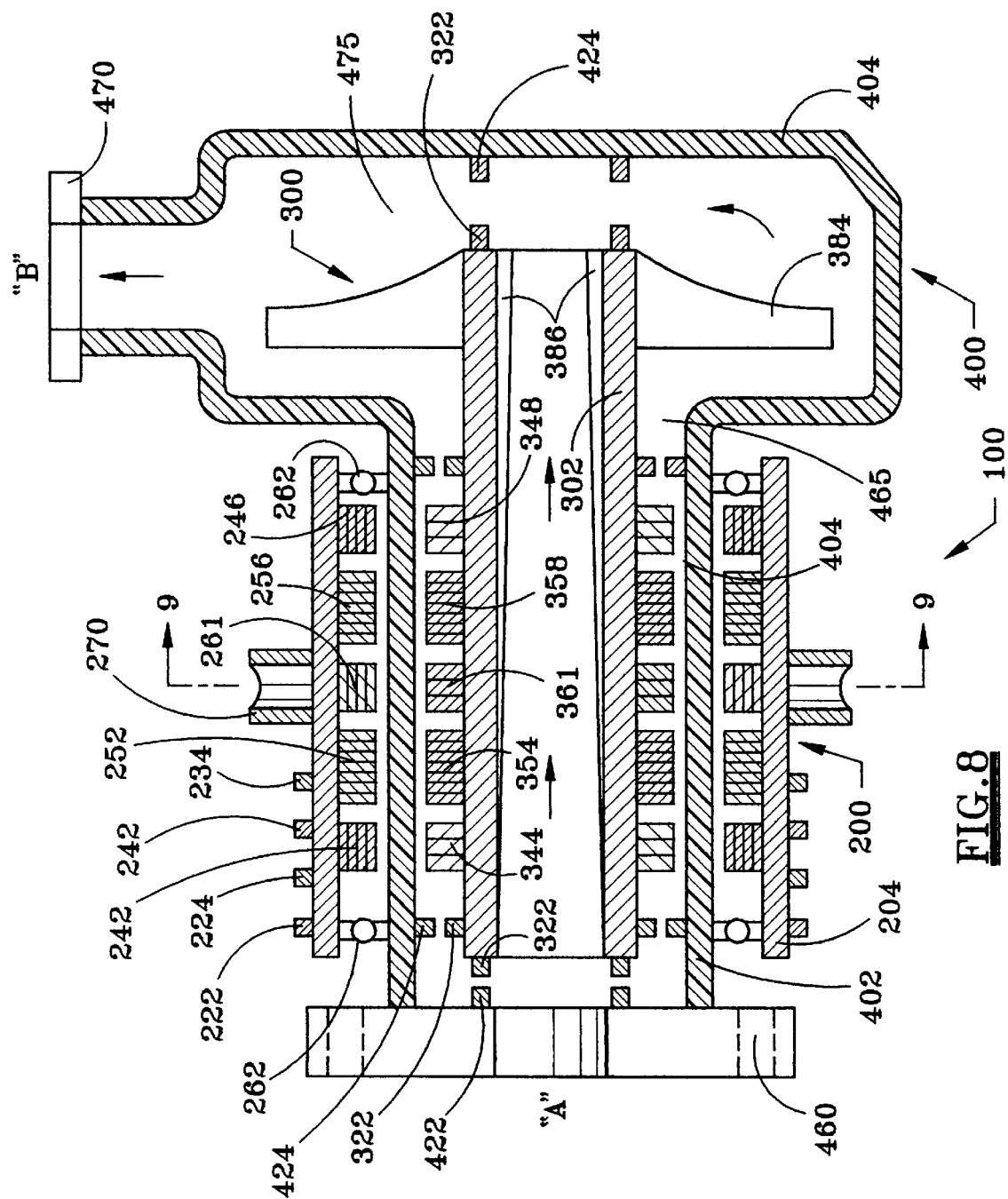
FIG. 8 is an elevation view of a cross section of a tube pump as practiced using the present invention.
Figure 9:
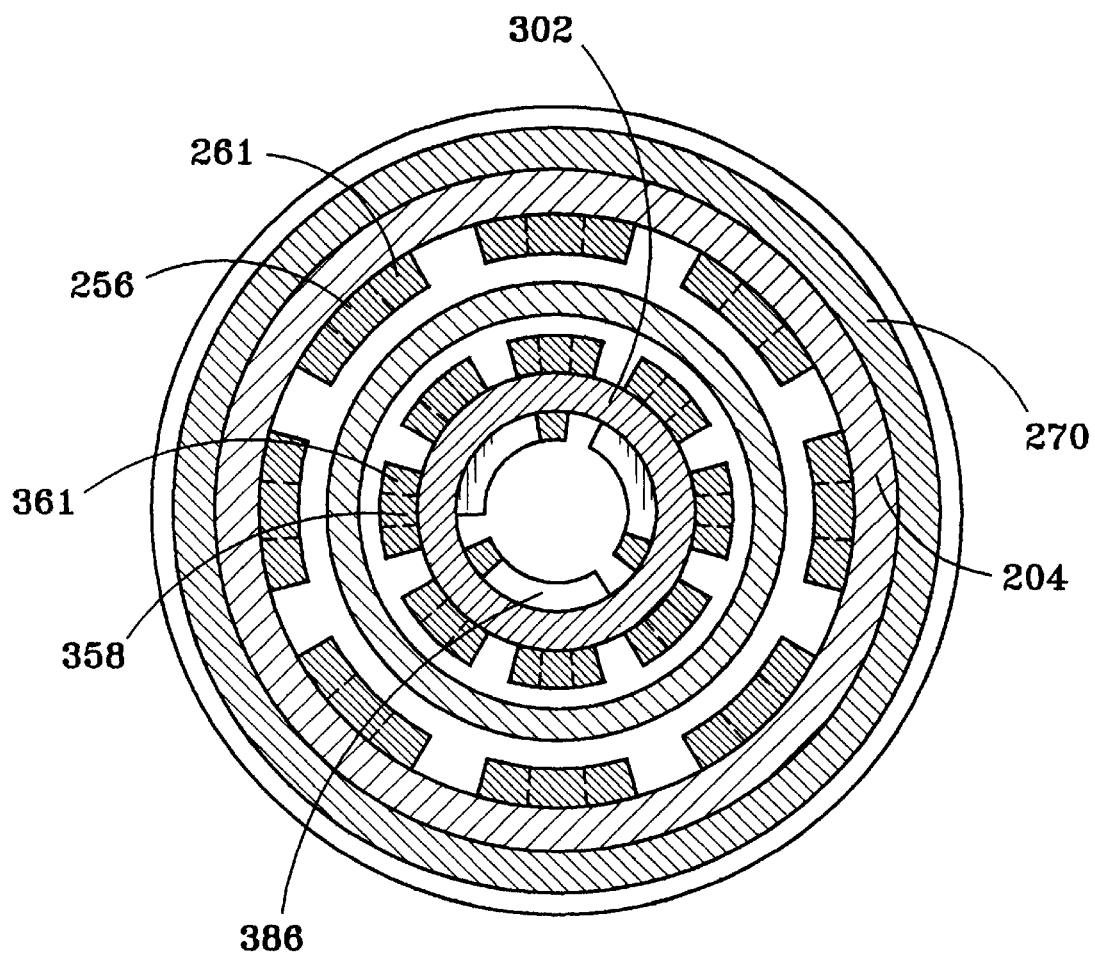
FIG. 9 is a cross-sectional of the tube pump apparatus illustrated in FIG. 8 as taken along the section lines 9—9.

FIGS. 8 and 9 illustrate a tube pump 100 adapted for practicing the present invention. The tube pump 100 comprises a driver assembly 200, a activated assembly 300 and a containment assembly 400. The tube pump 100 is similar to the apparatus illustrated in FIGS. 4 and 5 in that the driver assembly 200 is exterior of the containment assembly 400, which in turn is exterior of the activated assembly 300. However, the arrangement of the flow and overall effectiveness is different since the tube pump provides that the flow enters an aperture A such that it passes the entire length of a rotor 302. Disposed within the rotor 302 are a plurality of vanes 386. The flow enters the propelled rotor 302 at one end where the vanes are minimal. As the longitudinal distance within the rotor 302 is traversed the vanes 386 are increased in dimension. As the flow passes out of the vaned end of the rotor 302, it enters a cavity region 475 contained by the containment assembly 400. Fixedly engaged to the exit end of the rotor 302 is a centrifugal impeller 384 that provides a second pumping stage. The centrifugal impeller 384 provides that the fluid exiting into the cavity 475 is forced out of the containment assembly via an output aperture B through a discharge flange 470.

In conformity with practicing the presently preferred embodiment of the present invention, the diamagnetic casing 402 has associated with its outer surface, an exciter 344, ferro-magnetic elements 354, 358, a ferro-magnetic element 361 for a thrust bearing and an exciter 348. In operative relationship to the components associated with the outer portion of the rotor casing 402, a driver rotor has associated with it a first distance sensor 242, an electro-magnet 252, an electro-magnet 261 for a thrust bearing, an electro-magnet 256 and a second distance sensor 246. The driver rotor 204 is substantially an open ended cylinder which rotates about a cylindrical portion of the containment assembly 400. The driver rotor is in moving relationship with the fixed rotor casing 402 of the containment assembly 400. The fixed moving relationship of the driver rotor 402 is provided using a plurality of ball bearings 262. It can be appreciated by those skilled in the art that another engagement mechanism, other than the ball bearings 262, is readily adaptable for use by those skilled in the art. The flow will enter an aperture A via a suction flange 460. The flow will pass through the central diameter of the pump tube impeller 302 so as to pass into the cavity region 475 of the containment assembly 400. The flow will then be forced, by the effect of the centrifugal impeller 384, out the aperture B which is defined by the discharge flange 470. The rotation of the activated assembly 300 is provided, and fine tuned by the relationship of the distance sensors 242, 246 and the electromagnets 252, 256 on one hand, and the exciters 344, 348 and the ferromagnetic elements 354, 358 on the other hand.

Figure 10:
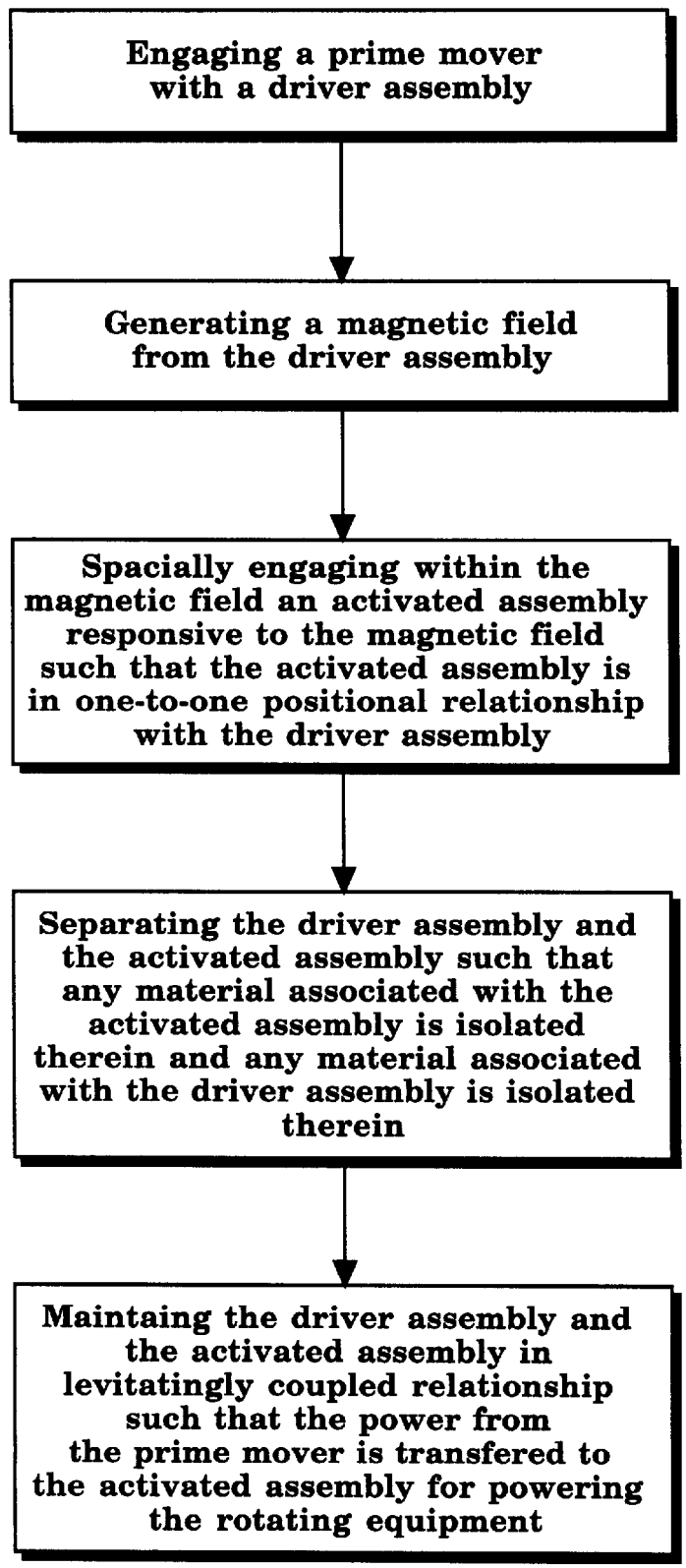
FIG. 10 is a flow chart illustrating one embodiment of the method of the present invention.

FIG. 10 is a flow chart illustrating one embodiment of the method of the present invention. The method for levitating and coupling rotating equipment comprises the steps of engaging a prime mover with a driver assembly, generating a magnetic field from the driver assembly, spacially engaging within the magnetic field an activated assembly responsive to the magnetic field such that the activated assembly is in one-to-one positional relationship with the driver assembly, separating the driver assembly and the activated assembly such that any material associated with the activated assembly is isolated therein and any material associated with the driver assembly is isolated therein, and maintaing the driver assembly and the activated assembly in levitatingly coupled relationship such that the power from the prime mover is transfered to the activated assembly for powering the rotating equipment.

Additional advantages and modification will readily occur to those skilled in the art. The invention in its broader aspects is therefore not limited to the specific details, representative apparatus, and the illustrative examples shown and described herein. Accordingly, the departures may be made from the details without departing from the spirit or scope of the disclosed general inventive concept.

What is claimed is:

1. A drive for rotating equipment comprising:
   (a) a driver assembly rotated b a prime mover, the driver assembly comprising:
      (1) at least one electromagnet for creating a magnetic field, and
      (2) at least one sensor for communicating with an exciter of an activated levitated assembly, the sensor for controlling the strength of the magnetic field associated with the electromagnet of the driver assembly,
   (b) the activated assembly in magnetic communication with the driver assembly such that the driver assembly rotates the activated assembly, the driver assembly and the activated assembly are in electromagnetic coupled relationship with respect to movement, the activated assembly comprising:
      (1) at least one magnet for creating a magnetic field, and
      (2) the exciter for communicating with the sensor of the driver assembly for identifying the positional relationship of the driver assembly with respect to the actuated assembly,
   such that the exciter and the sensor generate a signal for controlling the magnetic fields associated with the magnets in the assemblies for providing a levitating coupled relationship between the driver assembly and the activated assembly, and
   (c) a containment assembly for separating the driver assembly and the activated assembly such that any material associated with the activated assembly is isolated therein and any material associated with the driver assembly is isolated therein.

2. A sealed drive for use with a pumped fluid moved by a rotating device which fluid is prevented from escaping from the sealed drive, the drive comprising:
   (a) a driver assembly in rotational communication with a prime mover, the prime mover provides rotational power to the driver assembly, the driver assembly comprising:
      (1) a driver rotor responsive to the rotational power received from the prime mover such that the driver rotor rotates,
      (2) a plurality of electro-magnets on the driver rotor such that the electro-magnet is rotating, the electro-magnet for creating a magnetic field,
      (3) a plurality of sensors on the driver rotor, such that the sensors are rotating, the sensors for generating a control signal,
      (4) a transceiver associated with each sensor such that the transceiver and sensor are rotating in unison and are in constant communication one with the other, the sensor for generating a control signal for modulating power to the electro-magnet and thereby controlling the strength of the associated magnetic field for levitating an activated rotor,
   (b) an activated assembly comprising
      (1) the activated rotor responsive to the driver assembly such that the activated assembly levitates and rotates,
      (2) a plurality of ferro-magnets on the activated rotor such that each ferro-magnet is rotating, the ferro-magnet for creating a magnetic field, and
      (3) a plurality of excitors on the activated rotor,
   such that the sensors interact with the excitors on the activated rotor for generating the control signal, the control signal indicative of the relative position of the driver assembly with respect to the activated assembly for controlling the magnetic field associated with the electro-magnet for providing and maintaining a levitating coupled relationship between the driver assembly and the activated assembly due to the interaction of the magnetic fields generated by the electro-magnet of the driver assembly and the ferro-magnet of the activated assembly, and (c) a containment assembly for separating the driver assembly and the activated assembly such that any pumped fluid associated with the activated assembly is isolated therein.

3. A drive for rotating equipment as defined in claim 2 further comprising an exciter in operative association with the sensor for identifying the positional/distance relationship of the driver assembly with respect to the actuated assembly, such that the sensor controls the magnetic fields associated with the electro-magnets for providing a levitating coupled relationship between the driver assembly and the activated assembly.

4. A drive for rotating equipment as defined in claim 3 wherein the sensor is a strain gauge having a magnet associated therewith, and the exciter is a magnet for interacting with the gauge magnet.

5. A drive for rotating equipment as defined in claim 4 wherein the magnet associated with the strain gauge is a permanent magnet.

6. A drive for rotating equipment as defined in claim 4 wherein the magnet associated with the exciter is a permanent magnet.

7. A drive for rotating equipment as defined in claim 4 wherein the magnets are arranged in a like-pole configuration.

8. A drive for rotating equipment as defined in claim 3 wherein the ferro-magnet associated with the activated assembly is induced by the electro-magnet associated with the driver assembly.

9. A drive for rotating equipment as defined in claim 3 wherein the driver assembly comprises a cylinderical member having both ends open with the cylinderical member engaged with the prime mover, and the activated assembly comprises a rotor having a channel there through, the channel having at least one vane therein such that the rotor is operatively engaged in the cylinderical member of the driver assembly.

10. A drive for rotating equipment as defined in claim 3 wherein the activated assembly further comprises an impeller at one end of the rotor.

11. A drive for rotating equipment as defined in claim 2 wherein the driver assembly comprises a cylinderical member having an open end and a closed end with the closed end engaged with the prime mover, and the activated assembly comprises a rotor and an impeller such that the rotor is operatively engaged in the cylinderical member of the driver assembly.

12. A drive for rotating equipment as defined in claim 11 wherein the rotor of the driver assembly has buoyancy for enhancing movement characteristics, reducing the required magnetic field strength during levitation and reducing friction when not levitating.

13. A drive for rotating equipment as defined in claim 11 wherein the driver assembly is configured with the activated assembly to be symmetrical about the center of gravity thereof.

14. A drive for rotating equipment as defined in claim 2 wherein the driver assembly comprises a cylinderical member engaged with the prime mover, and the activated assembly comprises a device, the device is adapted for receiving the cylinderical member of the driver assembly such that the cylinderical member is operatively engaged in the device of the activated assembly.

15. A drive for rotating equipment as defined in claim 14 wherein the device comprises at least one cartridge for removeably engaging the activated assembly.

16. A drive for rotating equipment as defined in claim 15 wherein the cartridge for removeably engaging the activated assembly comprises a fan.

17. A drive for rotating equipment as defined in claim 15 wherein the cartridge for removeably engaging the activated assembly comprises a multistage centrifugal compressor.

18. A drive for rotating equipment as defined in claim 15 wherein the cartridge for removeably engaging the activated assembly comprises a multistage centrifugal pump.

19. A method for levitating and coupling a rotating device for use with a pumped fluid moved by the rotating device which fluid is prevented from escaping, comprising the steps of:

(a) rotating a driver assembly with a prime mover, the driver assembly having at least one rotating electro-magnet, at least one rotating sensor and at least one transceiver, (b) separating the driver assembly from the pumped fluid by a containment assembly, (c) creating a magnetic field using the rotating electro-magnet, (d) generating a control signal from the rotating sensor, (e) receiving the control signal from the rotating sensor via the transceiver, (f) generating a modulation signal for transmission by the transceiver, (g) modulating power to the rotating electro-magnet via the modulation signal from the transceiver thereby controlling the strength of the associated magnetic field, (h) activating a ferro-magnet on an activated assembly such that the ferro-magnet is rotating, (i) determining the relative position of the driver assembly with respect to the activated assembly by the interaction of the control signal of the rotating sensor with the activated assembly, (j) controlling the magnetic field associated with the rotating electro-magnet for providing and maintaining a levitated and coupled relationship between the driver assembly and the activated assembly due to the interaction of the magnetic fields generated by the rotating electro-magnet of the driver assembly and the rotating ferro-magnet of the activated assembly, (k) maintaining a one-to-one positional relationship between the driver assembly and the activated assembly due to the interaction of the magnetic fields generated by the rotating electro-magnet of the driver assembly and the rotating ferro-magnet of the activated assembly, (l) separating the driver assembly and the activated assembly such that the pumped fluid from the rotating device is isolated between the containment assembly and the activated assembly, whereby maintaing the driver assembly and the activated assembly in coupled relationship and maintaining the driver assembly and the activated assembly in levitating relationship is defined as activating, such that the prime mover drives the driver assembly, the driver assembly activates the activated assembly, and the activated assembly drives the rotating equipment.

\* \* \* \* \*